United States Patent
Mao et al.

(10) Patent No.: US 11,388,403 B2
(45) Date of Patent: Jul. 12, 2022

(54) VIDEO ENCODING METHOD AND APPARATUS, STORAGE MEDIUM, AND DEVICE

(71) Applicant: TENCENT TECHNOLOGY (SHENZHEN) COMPANY LIMITED, Shenzhen (CN)

(72) Inventors: Xunan Mao, Shenzhen (CN); Licai Guo, Shenzhen (CN); Yongfang Shi, Shenzhen (CN); Anlin Gao, Shenzhen (CN); Xinwei Gao, Shenzhen (CN); Tao Zhang, Shenzhen (CN); Haibo Deng, Shenzhen (CN); Chenchen Gu, Shenzhen (CN); Jing Lv, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/996,443

(22) Filed: Aug. 18, 2020

(65) Prior Publication Data

US 2020/0382781 A1 Dec. 3, 2020

Related U.S. Application Data

(63) Continuation of application No. PCT/CN2019/078432, filed on Mar. 18, 2019.

(30) Foreign Application Priority Data

Apr. 27, 2018 (CN) .......................... 201810394329.9

(51) Int. Cl.
*H04N 19/124* (2014.01)
*H04N 19/132* (2014.01)
*H04N 19/172* (2014.01)

(52) U.S. Cl.
CPC ......... *H04N 19/124* (2014.11); *H04N 19/132* (2014.11); *H04N 19/172* (2014.11)

(58) Field of Classification Search
CPC .............................. H04N 19/196; H04N 19/00
See application file for complete search history.

(56) References Cited

U.S. PATENT DOCUMENTS

| 7,352,808 B2 | 4/2008 | Ratakonda et al. |
| 8,175,147 B1 * | 5/2012 | Webb ................... H04N 19/152 |
| | | 375/240.03 |

(Continued)

FOREIGN PATENT DOCUMENTS

| CN | 1906949 | 1/2007 |
| CN | 101461149 A | 6/2009 |

(Continued)

OTHER PUBLICATIONS

Office Action dated Mar. 19, 2021 in Chinese Application No. 201810394329.9, along with an English translation.

(Continued)

*Primary Examiner* — Kyle M Lotfi
(74) *Attorney, Agent, or Firm* — ArentFox Schiff LLP

(57) ABSTRACT

In a video encoding method, a to-be-encoded video is obtained. The video includes at least two video frames arranged in sequence. A quantization parameter and a quantization parameter threshold of an $i^{th}$ video frame is calculated, where i is a positive integer greater than or equal to 2. A coding resolution of the $i^{th}$ video frame is determined according to the quantization parameter and the quantization parameter threshold. The coding resolution is a first coding resolution in a case that the $i^{th}$ video frame is sampled, and the coding resolution is a second coding resolution in a case that the $i^{th}$ video frame is downsampled. Then the $i^{th}$ video frame is encoded at the coding resolution.

20 Claims, 6 Drawing Sheets

(56) References Cited

U.S. PATENT DOCUMENTS

| | | | |
|---|---|---|---|
| 8,270,473 B2 | 9/2012 | Chen et al. | |
| 2007/0280349 A1* | 12/2007 | Prieto | H04N 19/137 375/240.03 |
| 2013/0156103 A1 | 6/2013 | Wang et al. | |
| 2016/0057418 A1 | 2/2016 | Lei et al. | |
| 2017/0085872 A1 | 3/2017 | Perron et al. | |
| 2017/0208328 A1 | 7/2017 | Kuusela | |
| 2018/0131937 A1* | 5/2018 | Melnyk | H04N 19/172 |

FOREIGN PATENT DOCUMENTS

| | | |
|---|---|---|
| CN | 102461169 | 5/2012 |
| CN | 102625104 A | 8/2012 |
| CN | 107040781 | 8/2017 |
| CN | 107155107 A | 9/2017 |
| CN | 108391127 | 8/2018 |
| EP | 2 441 265 A2 | 4/2012 |
| EP | 3 145 201 A1 | 3/2017 |
| JP | 2003-32677 A | 1/2003 |
| JP | 2007-520157 A | 7/2007 |
| JP | 2011-223315 A | 11/2011 |
| KR | 20160144952 A | 12/2016 |
| WO | WO 2010/144521 A2 | 12/2010 |
| WO | WO 2017/127213 A1 | 7/2017 |

OTHER PUBLICATIONS

International Search Report dated Jun. 5, 2019 in PCT Application No. PCT/CN2019/078432 (with English Translation).

Written Opinion dated Jun. 5, 2019 in PCT Application No. PCT/CN2019/078432 (with English Translation).

Extended European Search Report dated May 26, 2021 in European Application No. 19792389.9.

Communication Pursuant to Rules 70(2) and 70a(2) EPC dated Jun. 15, 2021 in European Application No. 19792389.9.

Office Action dated Nov. 24, 2021, in Japanese Patent Application No. 2020-551298 (with English-language translation).

* cited by examiner

VIDEO ENCODING METHOD AND APPARATUS, STORAGE MEDIUM, AND DEVICE

RELATED APPLICATION

This application is a continuation of International Application No. PCT/CN2019/078432 filed on Mar. 18, 2019, which claims priority to Chinese Patent Application No. 201810394329.9, entitled "VIDEO ENCODING METHOD AND APPARATUS, STORAGE MEDIUM, AND DEVICE" filed on Apr. 27, 2018. The entire disclosures of the prior applications are hereby incorporated by reference in their entirety.

FIELD OF THE TECHNOLOGY

Exemplary embodiments of the present disclosure relate to video encoding.

BACKGROUND

A video is a video frame sequence that includes a plurality of video frames arranged in sequence. Because the video has a large data volume, the video may be compressed by coding, and during coding, a coding resolution of each video frame in the video needs to be determined. The following describes coding resolution types and video frame types.

Two types of coding resolutions are provided in the related art. A first coding resolution is a resolution in a case that the video frame is sampled, and a second coding resolution is a resolution in a case that the video frame is downsampled. Downsampling herein corresponds to a sequence of sample values that are sampled at intervals of several sample values. As can be appreciated, the second coding resolution is less than the first coding resolution. According to another aspect, two types of video frames are provided in the related art. One type is an I frame, and the other type is a P frame. The I frame is an intra-frame prediction frame and carries all information, and can be encoded without reference to other frames. The P frame is an inter-frame prediction frame, and needs to refer to the other frames for encoding.

Based on features of the foregoing two types of video frames, when encoding each video frame, a terminal needs to determine whether the video frame is an I frame or a P frame. When the video frame is an I frame, the video frame is encoded at the first coding resolution. When the video frame is a P frame, the video frame is encoded at the second coding resolution.

Video frames of the same type correspond to the same coding resolution in the foregoing methods, and as a result, the coding mode is inflexible.

SUMMARY

In exemplary aspects, a video encoding method includes obtaining, by circuitry of a terminal, a to-be-encoded video, where the video includes at least two video frames arranged in sequence. A quantization parameter and a quantization parameter threshold of an $i^{th}$ video frame are calculated by the circuitry of the terminal, where i is a positive integer greater than or equal to 2. A coding resolution of the $i^{th}$ video frame is determined according to the quantization parameter and the quantization parameter threshold. The coding resolution includes a first coding resolution in a case that the $i^{th}$ video frame is sampled, and a second coding resolution in a case that the $i^{th}$ video frame is downsampled. Then the $i^{th}$ video frame is encoded at the coding resolution.

In exemplary aspects, calculating a quantization parameter for the $i^{th}$ frame includes reading a specified quantization parameter. The quantization parameter is then determined as the quantization parameter of the $i^{th}$ video frame in a case that a coding mode of the $i^{th}$ video frame is a fixed-quality coding mode. A quantization parameter of a first coding block in the $i^{th}$ video frame is calculated. The quantization parameter of the first coding block is determined as the quantization parameter of the $i^{th}$ video frame in a case that the coding mode of the $i^{th}$ video frame is a fixed-bit-rate coding mode.

In exemplary aspects, in the calculating a quantization parameter of a first coding block in the $i^{th}$ video frame, an average value of actual quantization parameters of all coding blocks in the $(i-1)^{th}$ video frame is calculated, in a case that an $(i-1)^{th}$ video frame is an I frame and the $(i-1)^{th}$ video frame is encoded at the second coding resolution, a first offset and a second offset are obtained, and a sum of the average value, the first offset, and the second offset is determined as the quantization parameter of the first coding block. In a case that an $(i-1)^{th}$ video frame is an I frame and the video frame is encoded at the first coding resolution, the average value of actual quantization parameters of all coding blocks in the $(i-1)^{th}$ video frame is calculated, the second offset is obtained, and a sum of the average value and the second offset is determined as the quantization parameter of the first coding block. In a case that an $(i-1)^{th}$ video frame is a P frame and the $(i-1)^{th}$ video frame is encoded at the first coding resolution, the average value of actual quantization parameters of all coding blocks in the $(i-1)^{th}$ video frame is calculated, and the average value is determined as the quantization parameter of the first coding block. In a case that an $(i-1)^{th}$ video frame is a P frame and the $(i-1)^{th}$ video frame is encoded at the second coding resolution, the average value of actual quantization parameters of all coding blocks in the $(i-1)^{th}$ video frame is calculated, the first offset is obtained, and a sum of the average value and the first offset is determined as the quantization parameter of the first coding block. The first offset is an offset between a quantization parameter corresponding to the first coding resolution and a quantization parameter corresponding to the second coding resolution, and the second offset is an offset between quantization parameters of the I frame and the P frame.

In exemplary aspects, in the calculating a quantization parameter threshold of the $i^{th}$ video frame, a first coding cost in a case that the $i^{th}$ video frame is assumed to be an I frame is calculated, a second coding cost in a case that the $i^{th}$ video frame is assumed to be a P frame is calculated, and the first coding cost is divided by the second coding cost to obtain a coding cost ratio. The quantization parameter threshold is determined according to the coding cost ratio, where the coding cost ratio is in a positive correlation with the quantization parameter threshold.

In exemplary aspects, in the calculating a first coding cost in a case that the $i^{th}$ video frame is assumed to be an I frame, the $i^{th}$ video frame is divided into at least two coding blocks, and intra-frame prediction coding is performed on the coding blocks to obtain intra-frame coding costs. A sum of the intra-frame coding costs is determined as the first coding cost.

In exemplary aspects, in the calculating a second coding cost in a case that the $i^{th}$ video frame is assumed to be a P frame, the $i^{th}$ video frame is divided into at least two coding blocks, and inter-frame prediction coding is performed on the coding blocks to obtain inter-frame coding costs. A sum of the inter-frame coding costs is determined as the second coding cost.

In exemplary aspects, in a case that there are two threshold sets and the two threshold sets correspond to different coding resolutions, the quantization threshold parameter is determined according to the coding cost ratio, the two threshold sets, and the first coding resolution in a case that the coding resolution of the $i^{th}$ video frame is assumed to be the first coding resolution during calculation of the quantization parameter. The quantization threshold parameter is determined according to the coding cost ratio, the two threshold sets, and the second coding resolution in a case that the coding resolution of the $i^{th}$ video frame is assumed to be the second coding resolution during calculation of the quantization parameter.

In exemplary aspects, in the determining the quantization threshold parameter, a threshold set corresponding to the first coding resolution is searched for in the two threshold sets, and the quantization threshold parameter is searched for in the threshold set according to the coding cost ratio.

In exemplary aspects, in determining the quantization threshold parameter, a threshold set corresponding to the second coding resolution is searched for in the two threshold sets, and the quantization threshold parameter is searched for in the threshold set according to the coding cost ratio.

In exemplary aspects, in the determining a coding resolution of the $i^{th}$ video frame, the coding resolution of the $i^{th}$ video frame is determined to be the first coding resolution in a case that the quantization parameter is less than or equal to the quantization parameter threshold, and the coding resolution of the $i^{th}$ video frame is determined to be the second coding resolution in a case that the quantization parameter is greater than the quantization parameter threshold.

In exemplary aspects, in a case that there is one threshold set and the threshold set corresponds to the first coding resolution, before the determining a coding resolution of the $i^{th}$ video frame, the quantization parameter is determined as a final quantization parameter in a case that the coding resolution of the $i^{th}$ video frame is assumed to be the first coding resolution during calculation of the quantization parameter. The first offset is added to the quantization parameter to obtain the final quantization parameter in a case that the coding resolution of the $i^{th}$ video frame is assumed to be the second coding resolution during calculation of the quantization parameter.

In exemplary aspects, in a case that there is one threshold set and the threshold set corresponds to the second coding resolution and before the determining a coding resolution of the $i^{th}$ video frame, the first offset is subtracted from the quantization parameter to obtain a final quantization parameter in a case that the coding resolution of the $i^{th}$ video frame is assumed to be the first coding resolution during calculation of the quantization parameter. The quantization parameter is determined as the final quantization parameter in a case that the coding resolution of the $i^{th}$ video frame is assumed to be the second coding resolution during calculation of the quantization parameter.

In exemplary aspects, a video encoding apparatus includes circuitry that obtains a to-be-encoded video, where the video includes at least two video frames arranged in sequence. The circuitry calculates, for an $i^{th}$ video frame in the at least two video frames, a quantization parameter, and a quantization parameter threshold of the $i^{th}$ video frame, where i is a positive integer greater than or equal to 2. The circuitry determines a coding resolution of the $i^{th}$ video frame according to the quantization parameter and the quantization parameter threshold. The coding resolution is a first coding resolution in a case that the $i^{th}$ video frame is sampled and a second coding resolution in a case that the $i^{th}$ video frame is downsampled. The circuitry encodes the $i^{th}$ video frame at the coding resolution determined by the determining module.

In exemplary aspects, the circuitry reads a specified quantization parameter, and determines the quantization parameter as the quantization parameter of the $i^{th}$ video frame, in a case that a coding mode of the $i^{th}$ video frame is a fixed-quality coding mode. The circuitry calculates a quantization parameter of a first coding block in the video frame, and determines the quantization parameter of the first coding block as the quantization parameter of the $i^{th}$ video frame in a case that the coding mode of the $i^{th}$ video frame is a fixed-bit-rate coding mode.

In exemplary aspects, the circuitry calculates, in a case that an $(i-1)^{th}$ video frame is an I frame and the $(i-1)^{th}$ video frame is encoded at the second coding resolution, an average value of actual quantization parameters of all coding blocks in the $(i-1)^{th}$ video frame, obtains a first offset and a second offset, and determines a sum of the average value, the first offset and the second offset as the quantization parameter of the first coding block. The circuitry calculates, in a case that an $(i-1)^{th}$ video frame is an I frame and the $(i-1)^{th}$ video frame is encoded at the first coding resolution, the average value of actual quantization parameters of all coding blocks in the $(i-1)^{th}$ video frame, obtains the second offset, and determines a sum of the average value and the second offset as the quantization parameter of the first coding block. The circuitry calculates, in a case that an $(i-1)^{th}$ video frame is a P frame and the $(i-1)^{th}$ video frame is encoded at the first coding resolution, the average value of actual quantization parameters of all coding blocks in the $(i-1)^{th}$ video frame, and determines the average value as the quantization parameter of the first coding block. The circuitry calculates, in a case that an $(i-1)^{th}$ video frame is a P frame and the $(i-1)^{th}$ video frame is encoded at the second coding resolution, the average value of actual quantization parameters of all coding blocks in the $(i-1)^{th}$ video frame, obtains the first offset, and determines a sum of the average value and the first offset as the quantization parameter of the first coding block. The first offset is an offset between a quantization parameter corresponding to the first coding resolution and a quantization parameter corresponding to the second coding resolution, and the second offset is an offset between quantization parameters of the I frame and the P frame.

In exemplary aspects, the circuitry calculates a first coding cost in a case that the $i^{th}$ video frame is assumed to be an I frame, calculates a second coding cost in a case that the $i^{th}$ video frame is assumed to be a P frame, and divides the first coding cost by the second coding cost to obtain a coding cost ratio. The circuitry determines the quantization parameter threshold according to the coding cost ratio, where the coding cost ratio is in a positive correlation with the quantization parameter threshold.

In exemplary aspects, the circuitry divides the $i^{th}$ video frame into at least two coding blocks, performs intra-frame prediction coding on the coding blocks to obtain intra-frame coding costs, and determines a sum of the intra-frame coding costs as the first coding cost.

In exemplary aspects, the circuitry divides the $i^{th}$ video frame into at least two coding blocks, performs inter-frame prediction coding on the coding blocks to obtain inter-frame coding costs, and determines a sum of the inter-frame coding costs as the second coding cost.

In exemplary aspects, in a case that there are two threshold sets and the two threshold sets correspond to different coding resolutions, the circuitry determines the quantization threshold parameter according to the coding cost ratio, the two threshold sets, and the first coding resolution in a case that the coding resolution of the $i^{th}$ video frame is assumed to be the first coding resolution during calculation of the quantization parameter. The circuitry determines the quantization threshold parameter according to the coding cost ratio, the two threshold sets, and the second coding resolution in a case that the coding resolution of the $i^{th}$ video frame is assumed to be the second coding resolution during calculation of the quantization parameter.

In an exemplary aspect, a non-transitory computer-readable medium encoded with computer-readable instructions that, when executed by a processor, cause the processor to perform the following method. A to-be-encoded video is obtained, where the video includes at least two video frames arranged in sequence. A quantization parameter and a quantization parameter threshold of an $i^{th}$ video frame in the at least two video frames is calculated, where i is a positive integer greater than or equal to 2. A coding resolution of the $i^{th}$ video frame is determined according to the quantization parameter and the quantization parameter threshold, the coding resolution being a first coding resolution or a second coding resolution, the first coding resolution being a resolution in a case that the $i^{th}$ video frame is sampled, and the second coding resolution being a resolution in a case that the $i^{th}$ video frame is downsampled. The $i^{th}$ video frame is encoded at the coding resolution.

BRIEF DESCRIPTION OF THE DRAWINGS

The following briefly describes the drawings used to describe the exemplary embodiments of the present disclosure more clearly. As can be appreciated, the accompanying drawings pertain to exemplary embodiments and other embodiments are possible without departing from the scope of the present disclosure.

DETAILED DESCRIPTION

To make objectives, technical solutions, and advantages of the exemplary embodiments of the present disclosure clearer, the following further describes exemplary aspects of the disclosure with reference to the accompanying drawings.

Before exemplary embodiments of the present disclosure are explained and described in detail, an application scenario of the exemplary embodiments is described.

The exemplary embodiments are applied to an application scenario of video compression. After a video is compressed, the video may be transmitted, so that a bandwidth occupied by the video in a transmission process is reduced, and transmission time consumption is reduced. The video may alternatively, or additionally, be stored, so that a storage space occupied by the video is reduced. Other operations may also be performed on the video, which are not limited herein.

Video transmission includes real-time transmission and non-real-time transmission. The real-time transmission may be a real-time video call using an instant messaging client, a real-time live broadcast using a live broadcast client, or the like. The non-real-time transmission may be video uploading, downloading, or the like.

Figure 1:
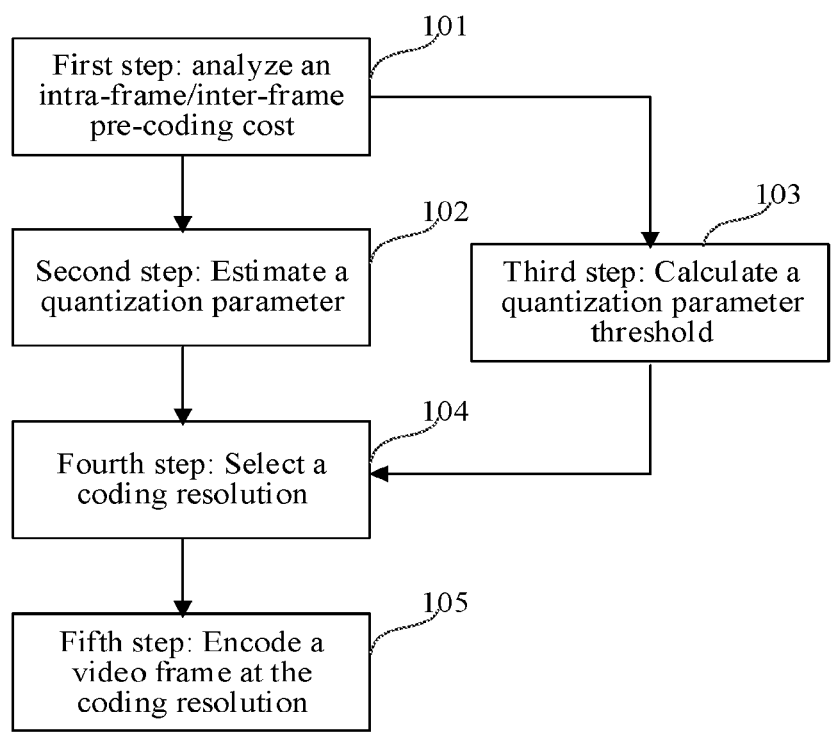
FIG. 1 is a flowchart of determining a coding resolution according to some embodiments of this application.

As illustrated in FIG. 1, an exemplary embodiment of this application includes five steps. In a first step 101, an intra-frame/inter-frame pre-coding cost is analyzed to determine a coding cost ratio. In a second step 102, a quantization parameter is estimated according to the coding cost ratio. In a third step 103, a quantization parameter threshold is calculated. In a fourth step 104, a coding resolution is selected according to the quantization parameter and the quantization parameter threshold. In a fifth step 105, a video frame is encoded at the selected coding resolution.

In the exemplary embodiment, I frames in a video may correspond to the same coding resolution, or may correspond to different coding resolutions. P frames in the video may correspond to the same coding resolution, or may correspond to different coding resolutions. That is, video frames of the same type may correspond to the same coding resolution, or may correspond to different coding resolutions, so that flexibility of a coding mode is improved. Because the quantization parameter is correlated with the image quality, and the quantization parameter threshold is correlated with the desired image quality, the determining the coding resolution of the video frame according to the quantization parameter and the quantization parameter threshold is equivalent to selecting the coding resolution of the video frame according to the image quality and the desired image quality, so that precision of the determined coding resolution is improved.

Figure 2:
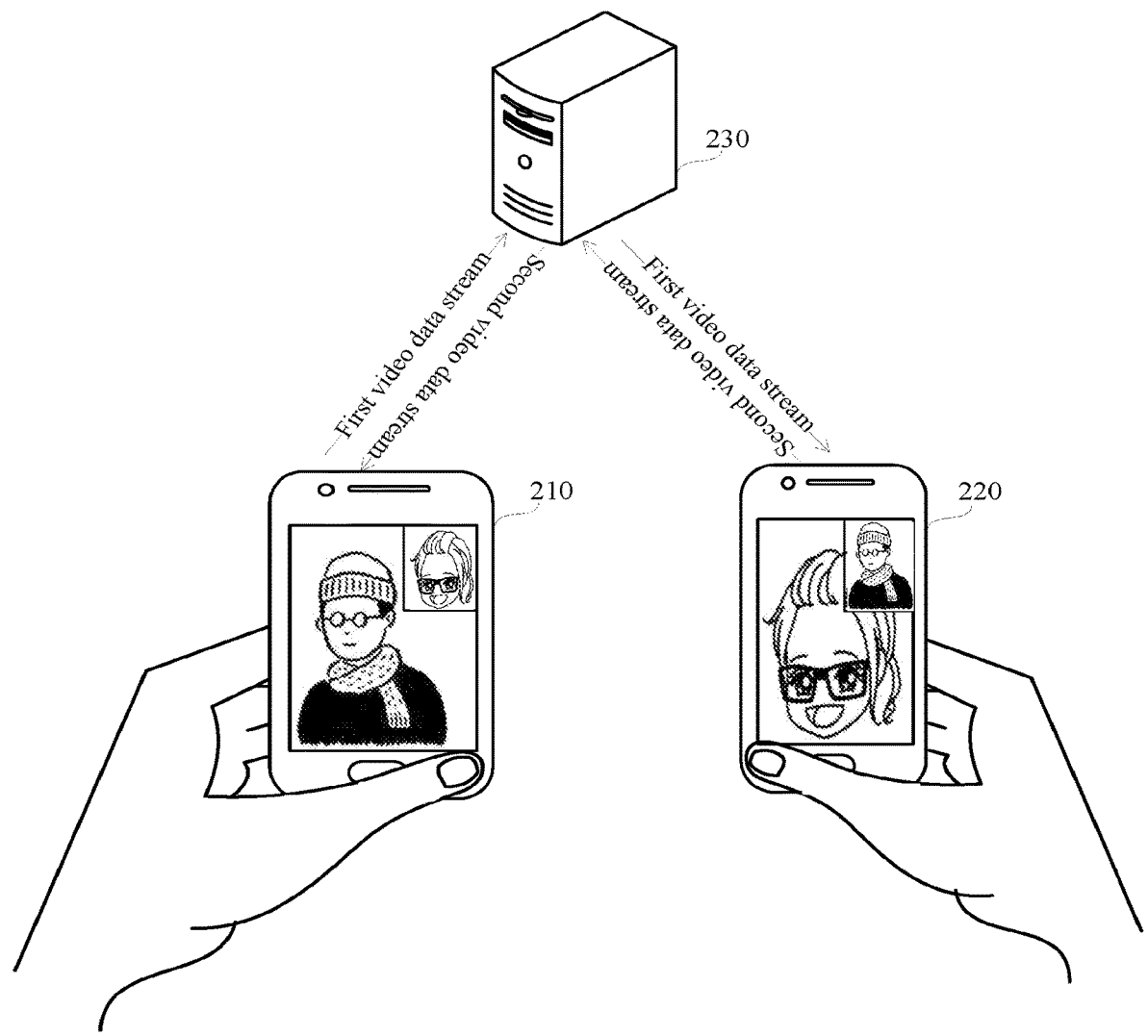
FIG. 2 is a schematic structural diagram of a video coding system according to some exemplary embodiments.

FIG. 2 is a schematic structural diagram of a video coding system according to an exemplary embodiment of the present disclosure. If, for example, the video coding system is applied to a scenario in which a real-time video call is performed by using an instant messaging client, the video coding system includes at least a first terminal 210, a second terminal 220, and a server 230. The first terminal 210 establishes a connection to the server 230 through a wired network or a wireless network. The second terminal 220 establishes a connection to the server 230 through a wired network or a wireless network.

The first terminal 210 is a device having video data stream receiving and transmitting functions, for example, a smartphone. The instant messaging client, such as a WeChat client or a QQ client, is installed in the first terminal 210.

The second terminal 220 is a device having video data stream receiving and transmitting functions, for example, a smartphone. At least one same instant messaging client is installed in the second terminal 220 and the first terminal 210, and the instant messaging client in the second terminal 220 may communicate with the instant messaging client in the first terminal 210.

The server 230 is a background server of the instant messaging client, and may be a server cluster including one or more servers, or may be a cloud computing center.

In the exemplary embodiment of the present disclosure, a real-time video call may be initiated by the first terminal 210 to the second terminal 220 through the server 230, or a real-time video call may be initiated by the second terminal 220 to the first terminal 210 through the server 230.

After the real-time video call is connected, a process of performing the real-time video call by a first user using the first terminal 210 and a second user using the second terminal 220 is described below. The first terminal 210 records the call process of the first user by using a camera to obtain a first video. The first video is encoded by using the video encoding method provided in this embodiment of this application, and a first video data stream obtained through encoding is transmitted to the server 230. The server 230 forwards the first video data stream to the second terminal 220. The second terminal 220 decodes the first video data stream according to a decoding mode corresponding to the coding mode, and plays the first video obtained through decoding. In addition, the second terminal 220 records the call process of the second user by using a camera to obtain a second video. The second video is encoded by using the coding mode provided in this embodiment of this application, and a second video data stream obtained through encoding is transmitted to the server 230. The server 230 forwards the second video data stream to the first terminal 210. The first terminal 210 decodes the second video data stream according to the decoding mode corresponding to the coding mode, and plays the second video obtained through decoding.

In addition to playing the second video, the first terminal 210 may also play the first video shot by itself. That is, the second video is played in a first area of a display interface of the first terminal 210, and the first video is played in a second area. Similarly, in addition to playing the first video, the second terminal 220 may also play the second video shot by itself. That is, the first video is played in a first area of a display interface of the second terminal 220, and the second video is played in a second area. The display interfaces of the first terminal 210 and the second terminal 220 are shown in FIG. 2.

Figure 3:
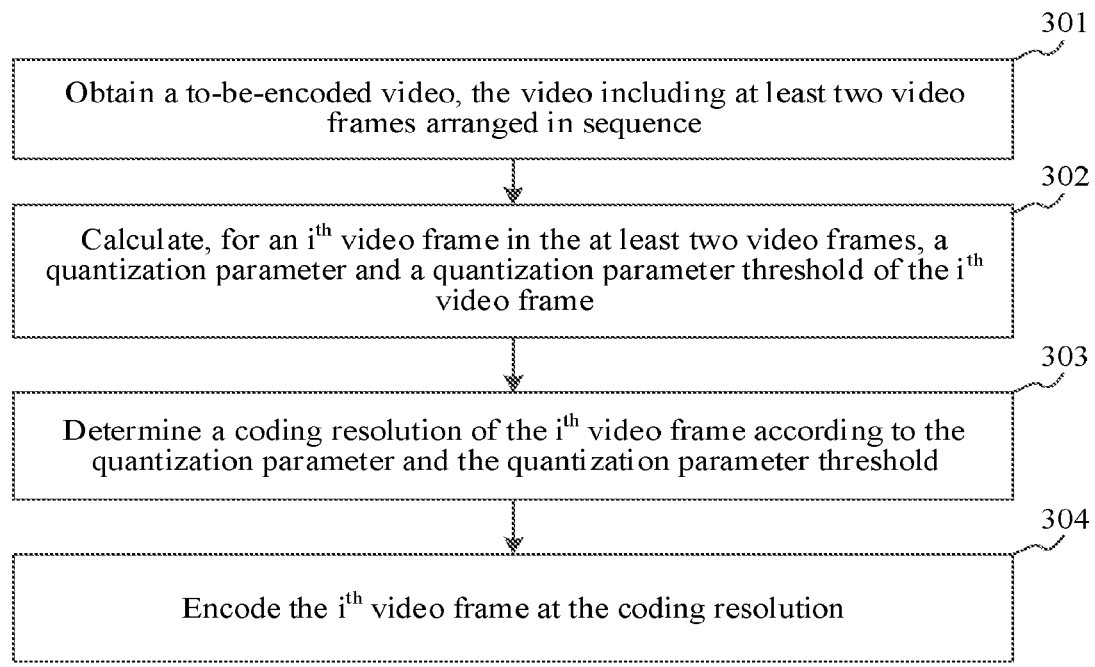
FIG. 3 is a method flowchart of a video encoding method according to an embodiment of this application.

FIG. 3 is a method flowchart of a video encoding method according to an exemplary embodiment of the present disclosure. The video encoding method may be applied to the first terminal or the second terminal shown in FIG. 2. The video encoding method includes the following steps:

In step 301, a to-be-encoded video is obtained. The video includes at least two video frames arranged in sequence. The video may be shot by the terminal, or may be downloaded by the terminal from a network, or may be obtained by the terminal from other devices. As one of ordinary skill would recognize, the source of the video is not limiting upon the present disclosure.

The video is a video frame sequence including at least two video frames arranged in sequence. The sequential arrangement herein refers to an arrangement according to a shooting sequence of the video frames, that is, an arrangement according to a chronological order of shooting of the video frames.

For the first video frame in the video frame sequence, the terminal encodes the video frame at a first coding resolution by default. For remaining video frames in the video frame sequence, the terminal sequentially reads a video frame from the video frame sequence, uses the video frame as an $i^{th}$ video frame, then performs step 302 and step 303 to select a coding resolution of the $i^{th}$ video frame, and finally performs step 304 to encode the $i^{th}$ video frame at the selected coding resolution, i being a positive integer greater than or equal to 2. The coding resolution is the first coding resolution or a second coding resolution. For details, refer to the description in step 303.

In step 302, a quantization parameter and a quantization parameter threshold of the $i^{th}$ video frame are calculated for an $i^{th}$ video frame in the at least two video frames. Quantization refers to a processing mode of sampling continuous signals to form discrete signals, to reduce the amount of data that needs to be encoded, and achieve a purpose of data compression. The quantization parameter is a parameter involved in a process of quantizing the video frame. The quantization parameter is a parameter used for representing quantization precision. The quantization parameter is in a negative correlation with the quantization precision. That is, a smaller quantization parameter indicates finer quantization, and in this case, the image quality is better, and a data compression ratio is not high. A larger quantization parameter indicates rougher quantization, and in this case, the image quality is relatively poor, and the data compression ratio is relatively high.

The quantization parameter is a sequence number corresponding to a quantization step. For example, if there are 52 quantization steps in Moving Picture Experts Group-4 Advanced Video Coding (H.264), a value of the quantization parameter is 0 to 51. Each quantization parameter is used for identifying one of the 52 quantization steps.

The quantization parameter threshold is a threshold used for representing a desired image quality. The desired image quality is an image quality acceptable by a user. The quantization parameter threshold is in a positive correlation with the desired image quality. That is, a poor desired image quality indicates a smaller quantization parameter threshold. A better desired image quality indicates a larger quantization parameter threshold.

Human eyes are sensitive to an image quality loss in a static scenario, and are insensitive to an image quality loss in a movement scenario. Therefore, human eyes have a relatively high requirement on the desired image quality of video frames in the static scenario, and the terminal may set a larger quantization parameter threshold for video frames in the static scenario, so that encoding is performed by using the first coding resolution preferentially, thereby improving the image quality. Human eyes have a relatively low requirement on the desired image quality of video frames in the movement scenario, and the terminal may set a smaller quantization parameter threshold for video frames in the movement scenario, so that encoding is performed by using the second coding resolution preferentially, thereby improving the data compression ratio.

In the exemplary embodiment, for the $i^{th}$ video frame in the at least two video frames, the terminal separately calculates a quantization parameter and a quantization parameter threshold of the $i^{th}$ video frame. The quantization parameter herein is estimated by the terminal, and may be different from an actual quantization parameter. For content of calculating the quantization parameter by the terminal, refer to the description in step 402 or step 403. For content of calculating the quantization parameter threshold, refer to the description in step 404 to step 407.

In step 303, a coding resolution of the $i^{th}$ video frame is determined according to the quantization parameter and the quantization parameter threshold. The coding resolution is a first coding resolution or a second coding resolution. The first coding resolution is a resolution in a case that the $i^{th}$ video frame is sampled, or may be referred to as a full resolution. The second coding resolution is a resolution in a case that the $i^{th}$ video frame is downsampled, or may be referred to as a downsampling resolution. The second coding resolution is less than the first coding resolution.

In step 304, the $i^{th}$ video frame is encoded at the coding resolution. In a case that the $i^{th}$ video frame is encoded at the first coding resolution, the image quality is better, and the data compression ratio is relatively low. In a case that the $i^{th}$ video frame is encoded at the second coding resolution, the image quality is relatively poor, and the data compression ratio is relatively high.

Based on the foregoing, according to the video encoding method provided in the exemplary embodiment of the present disclosure, a quantization parameter and a quantization parameter threshold of a video frame are separately calculated, and a coding resolution of the video frame is determined according to the quantization parameter and the quantization parameter threshold. In this way, video frames of the same type may correspond to the same coding resolution, or may correspond to different coding resolutions, thereby resolving a problem that the coding mode is inflexible when video frames of the same type correspond to the same coding resolution, so that flexibility of the coding mode is improved.

Because the quantization parameter is correlated with the image quality, and the quantization parameter threshold is correlated with the desired image quality, the determining the coding resolution of the video frame according to the quantization parameter and the quantization parameter threshold is equivalent to selecting the coding resolution of the video frame according to the image quality and the desired image quality, so that precision of determining the coding resolution is improved.

Figure 4:
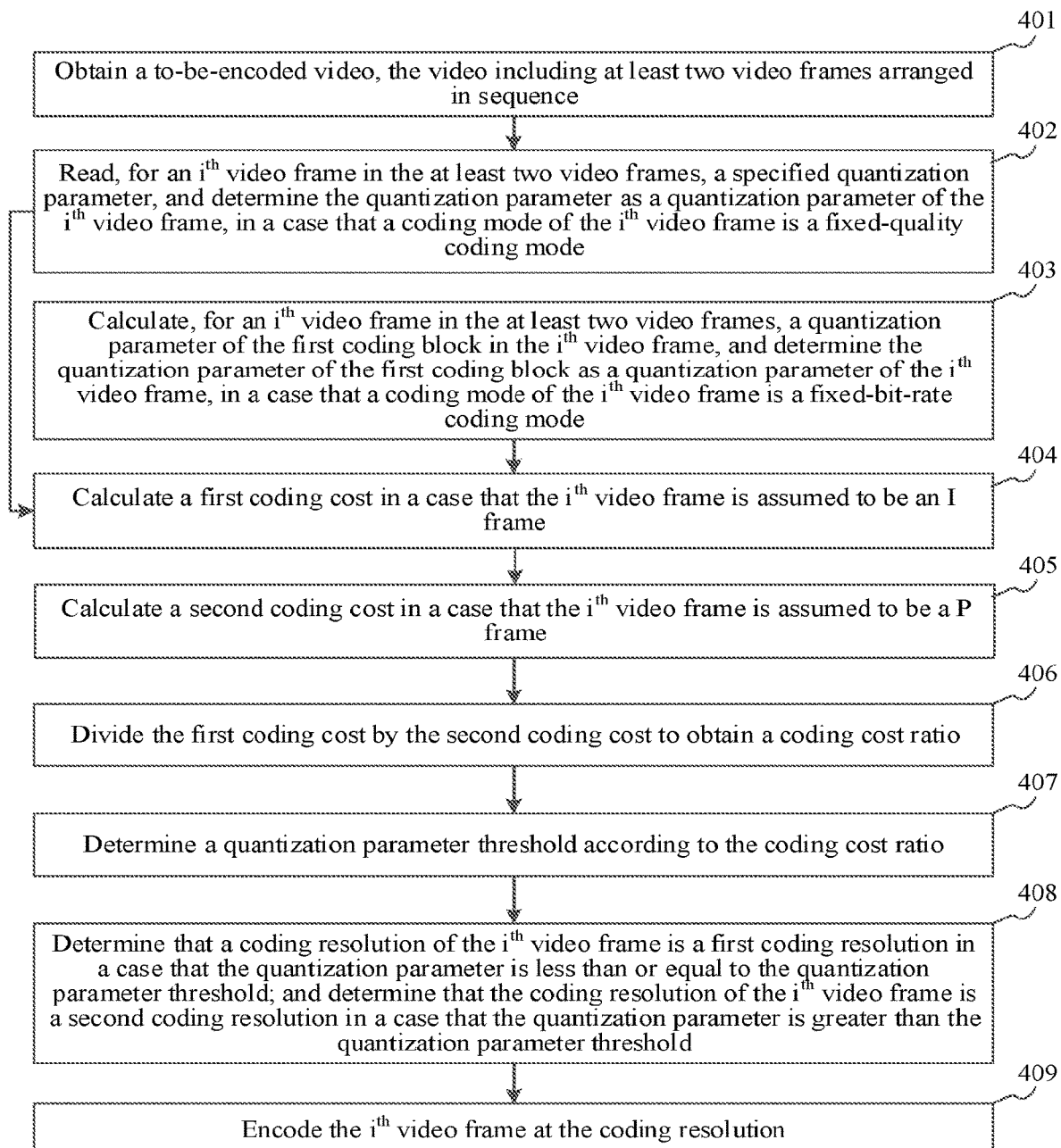
FIG. 4 is a method flowchart of a video encoding method according to another embodiment of this application.

FIG. 4 is a method flowchart of a video encoding method according to another embodiment of this application. The video encoding method may be applied to the first terminal or the second terminal shown in FIG. 2. The video encoding method includes the following steps.

In step 401, a to-be-encoded video is obtained, where the video includes at least two video frames arranged in sequence. The video may be shot by the terminal, or may be downloaded by the terminal from a network, or may be obtained by the terminal from other devices. The source of the video is not limiting upon the present disclosure. The video is a video frame sequence including at least two video frames arranged in sequence. The sequential arrangement herein refers to an arrangement according to a shooting sequence of the video frame, that is, an arrangement according to a chronological order of shooting of the video frames.

For the first video frame in the video frame sequence, the terminal encodes the video frame at the first coding resolution by default. For remaining video frames in the video frame sequence, the terminal sequentially reads a video frame from the video frame sequence, uses the video frame as an $i^{th}$ video frame, then performs step 402 to step 408 to select a coding resolution of the $i^{th}$ video frame, and finally performs step 409 to encode the $i^{th}$ video frame at the selected coding resolution, i being a positive integer greater than or equal to 2. The coding resolution is a first coding resolution or a second coding resolution. The first coding resolution is a resolution in a case that the video frame is sampled. The second coding resolution is a resolution in a case that the video frame is downsampled. For details, refer to the description in step 303.

In step 402, a specified quantization parameter is read for an $i^{th}$ video frame in the at least two video frames, and the quantization parameter is determined as a quantization parameter of the $i^{th}$ video frame. In a case that a coding mode of the $i^{th}$ video frame is a fixed-quality coding mode, step 404 is performed. The fixed-quality coding mode is a mode in which video frames are encoded with a constant image quality. That is, if each video frame is encoded in the fixed-quality coding mode, the image quality of each encoded video frame is constant.

The image quality of the video frame is correlated with the quantization parameter, and when the image quality is constant, it means that the quantization parameter is constant. Therefore, a constant quantization parameter may be preset for video frames in the fixed-quality coding mode. That is, in a case that the coding mode of the $i^{th}$ video frame is the fixed-quality coding mode, the quantization parameter of the $i^{th}$ video frame is preset. The terminal may directly read the quantization parameter of the $i^{th}$ video frame.

Different coding resolutions correspond to different quantization parameters. Therefore, before reading the quantization parameter, the terminal needs to assume a coding resolution of the $i^{th}$ video frame, and a quantization parameter corresponding to the coding resolution is read. A quantization parameter corresponding to the first coding resolution is greater than a quantization parameter corresponding to the second coding resolution. For example, the quantization parameter corresponding to the first coding resolution is 33, and the quantization parameter corresponding to the second coding resolution is 27.

Most video frames in a scenario of a real-time video call are encoded at the first coding resolution, so as to improve the image quality. Therefore, the terminal may assume that the coding resolution of the $i^{th}$ video frame is the first coding resolution. The terminal may also assume that the coding resolution of the $i^{th}$ video frame is the second coding resolution. This is not limiting upon the present disclosure.

In step 403, a quantization parameter of the first coding block in the $i^{th}$ video frame is calculated for an $i^{th}$ video frame in the at least two video frames, and the quantization parameter of the first coding block is determined as a quantization parameter of the $i^{th}$ video frame, in a case that the coding mode of the $i^{th}$ video frame is a fixed-bit-rate coding mode.

The fixed-bit-rate coding mode is a mode in which video frames are encoded at a constant bit rate. That is, if a plurality of video frames within each second are encoded in the fixed-bit-rate coding mode, a total size of all encoded video frames within each second is constant.

After video frames are encoded at the constant bit rate, the image quality of the video frames is unstable, and the image quality is correlated with the quantization parameter. Therefore, the terminal needs to dynamically determine the quantization parameter according to the image quality. That is, in a case that the coding mode of the $i^{th}$ video frame is the fixed-bit-rate coding mode, the terminal may dynamically calculate the quantization parameter of the $i^{th}$ video frame.

Different coding resolutions correspond to different quantization parameters. Therefore, before calculating the quantization parameter, the terminal needs to assume the coding resolution of the $i^{th}$ video frame, and then the quantization parameter is calculated based on the assumed coding resolution. Algorithms for calculating the quantization parameter are the same when the coding resolution is assumed to be the first coding resolution and the second coding resolution.

Calculation of the quantization parameter of the first coding block in the $i^{th}$ video frame may be performed according to one of the following four methods.

In a first method, in a case that an $(i-1)^{th}$ video frame is an I frame and the $(i-1)^{th}$ video frame is encoded at the second coding resolution, an average value of actual quantization parameters of all coding blocks in the $(i-1)^{th}$ video frame is calculated. A first offset and a second offset are obtained. A sum of the average value, the first offset and the second offset is determined as the quantization parameter of the first coding block.

In a case that a coding mode of the $(i-1)^{th}$ video frame is a fixed-quality coding mode, in an encoding process, the terminal divides the $(i-1)^{th}$ video frame into at least two coding blocks, and a quantization parameter of each coding block is a specified quantization parameter. Because the quantization parameter specified for each coding block is equal, the average value of the actual quantization parameters of all the coding blocks is still the specified quantization parameter.

In a case that the coding mode of the $(i-1)^{th}$ video frame is a fixed-bit-rate coding mode, in an encoding process, the terminal divides the $(i-1)^{th}$ video frame into at least two coding blocks, calculates an actual quantization parameter of each coding block according to an algorithm specified in an encoder, and adds up all the quantization parameters and then divides the sum of the quantization parameters by the quantity of coding blocks to obtain an average value.

During pre-coding of the $(i-1)^{th}$ video frame, a quantization parameter of the first coding block in the $(i-1)^{th}$ video frame is calculated first, and then the quantization parameter is assumed to be the quantization parameter of the $(i-1)^{th}$ video frame. In actual encoding, the terminal calculates an actual quantization of each coding block in the video frame. The actual quantization parameter obtained through calculation herein is different from the previously assumed quantization parameter. The average value of the actual quantization parameters obtained in the encoding process is calculated in this step.

The first offset is an offset between a quantization parameter corresponding to the first coding resolution and a quantization parameter corresponding to the second coding resolution, and may be an empirical value or calculated according to a formula, which is not limited in this embodiment. The first offset in this embodiment is demoted as $QP_{delta}$. The first coding resolution, the second coding resolution, and the first offset have the following relationship: the quantization parameter of the second coding resolution is obtained by subtracting the first offset from the quantization parameter of the first coding resolution. That is, the quantization parameter of the first coding resolution is obtained by adding the first offset to the quantization parameter of the second coding resolution.

The second offset is an offset between quantization parameters of the I frame and the P frame, and may be an empirical value or calculated according to a formula, which is not limited in this embodiment. The second offset in this embodiment is denoted by $QP_{offset-I/P}$. After the average value, the first offset and the second offset are obtained, the sum of the average value, the first offset and the second offset is used as the quantization parameter of the first coding block.

In a second method, in a case that an $(i-1)^{th}$ video frame is an I frame and the $(i-1)^{th}$ video frame is encoded at the first coding resolution, an average value of actual quantization parameters of all coding blocks in the $(i-1)^{th}$ video frame is calculated. A second offset is obtained. A sum of the average value and the second offset is determined as the quantization parameter of the first coding block. For a process of calculating the average value and obtaining the second offset, refer to the foregoing descriptions. Details are not described herein again for the sake of brevity. After the average value and the second offset are obtained, the sum of the average value and the second offset is used as the quantization parameter of the first coding block.

In a third method, in a case that an $(i-1)^{th}$ video frame is a P frame and the $(i-1)^{th}$ video frame is encoded at the first coding resolution, an average value of actual quantization parameters of all coding blocks in the $(i-1)^{th}$ video frame is calculated. The average value is determined as the quantization parameter of the first coding block. For a process of calculating the average value, refer to the foregoing descriptions. Details are not described herein again for the sake of brevity. After the average value is obtained, the average value is used as the quantization parameter of the first coding block.

In a fourth method, in a case that an $(i-1)^{th}$ video frame is a P frame and the $(i-1)^{th}$ video frame is encoded at the second coding resolution, an average value of actual quantization parameters of all the coding blocks in the $(i-1)^{th}$ video frame is calculated. A first offset is obtained. A sum of the average value and the first offset is determined as the quantization parameter of the first coding block. For a process of calculating the average value and obtaining the first offset, refer to the foregoing descriptions. Details are not described herein again for the sake of brevity. After the average value and the first offset are obtained, the sum of the average value and the first offset is used as the quantization parameter of the first coding block.

In the exemplary embodiment, one of the foregoing four methods may be selected according to the type and the coding resolution of the $(i-1)^{th}$ video frame, and then the selected method is used to calculate the quantization parameter of the first coding block in the $(i-1)^{th}$ video frame.

In step 404, a first coding cost is calculated in a case that the $i^{th}$ video frame is assumed to be an I frame. In the exemplary embodiment, the first coding cost is calculated based on the assumption that the $i^{th}$ video frame is an I frame, and the second coding cost is calculated based on the assumption that the $i^{th}$ video frame is a P frame, regardless of whether the $i^{th}$ video frame is actually an I frame or a P frame. The calculating a first coding cost in a case that the $i^{th}$ video frame is assumed to be an I frame may include the following sub-steps.

In a first sub-step the $i^{th}$ video frame is divided into at least two coding blocks. The terminal may divide the $i^{th}$ video frame into a plurality of coding blocks according to different algorithms. Thus, the algorithm used for division is not limiting upon the present disclosure. Also, the quantity of coding blocks obtained through different algorithms may be the same, or may be different as one of ordinary skill would recognize. In an exemplary implementation, the terminal divides the $i^{th}$ video frame into 8*8 coding blocks.

In a second sub-step, intra-frame prediction coding is performed on the coding blocks to obtain intra-frame coding costs. There are various algorithms for the intra-frame coding cost. The following describes two exemplary algorithms. In the first exemplary algorithm, the intra-frame coding cost is equal to a sum of absolute values of prediction residuals of all pixels in the coding blocks. In the second exemplary algorithm, the intra-frame coding cost is as follows: cost=D+λ*R, where D is a degree of distortion of each coding block, which may be represented by absolute values of differences between an encoded reconstructed image and an original image of all the pixels in the coding block, λ is a Lagrangian coefficient, and R is the quantity of bits occupied by the coding block.

In a third sub-step, a sum of the intra-frame coding costs is determined as the first coding cost. In an exemplary embodiment, the first coding cost is denoted by Icost. Before dividing the $i^{th}$ video frame into at least two coding blocks, the method further includes downsampling the $i^{th}$ video frame. The terminal may downsample the $i^{th}$ video frame by using a simple downsampling algorithm, to reduce a data volume of the $i^{th}$ video frame, thus improving a speed of subsequently calculating the first coding cost and the second coding cost, and finally improving a speed of determining the coding resolution. In an exemplary embodiment, the terminal downsamples the $i^{th}$ video frame by using a length-width ratio of 2:1. The terminal may also perform downsampling by using another ratio, and the ratio used is not limiting upon the present disclosure.

In step 405, a second coding cost is calculated in a case that the $i^{th}$ video frame is assumed to be a P frame. Calculating the second coding cost in a case that the $i^{th}$ video frame is assumed to be a P frame may include the following sub-steps.

In a first sub-step, the $i^{th}$ video frame is divided into at least two coding blocks. The terminal may divide the $i^{th}$ video frame into a plurality of coding blocks according to different algorithms, which are not limiting upon the present disclosure. The quantity of coding blocks obtained through different algorithms may be the same, or may be different. The algorithm for the coding block division in this step is the same as the algorithm for the coding block division in step 4041, so that the coding blocks obtained in this step are the same as the coding blocks obtained in step 4041. In an exemplary implementation, the terminal also divides the $i^{th}$ video frame into 8*8 coding blocks.

If the terminal first performs step 4041, the terminal may directly read an execution result of step 4041 to obtain the at least two coding blocks, to avoid spending time on repeated coding block division, and improving encoding efficiency.

In a second sub-step, inter-frame prediction coding is performed on the coding blocks to obtain inter-frame coding costs. An algorithm for the inter-frame coding costs is the same as that for the intra-frame coding costs. Details are not described herein again for the sake of brevity.

In a third sub-step, a sum of the inter-frame coding costs is determined as the second coding cost. In the exemplary embodiment, the second coding cost is denoted by Pcost.

An execution sequence of step 404 and step 405 is not limited by the exemplary embodiment. That is, the terminal may first calculate the first coding cost, and then calculate the second coding cost. The terminal may first calculate the second coding cost, and then calculate the first coding cost. The terminal may alternatively calculate the first coding cost and the second coding cost at the same time, or simultaneously.

In step 406, the first coding cost is divided by the second coding cost to obtain a coding cost ratio. In the exemplary embodiment, if the coding cost ratio is denoted by IPcost, IPcost=Icost/Pcost.

Figure 5:
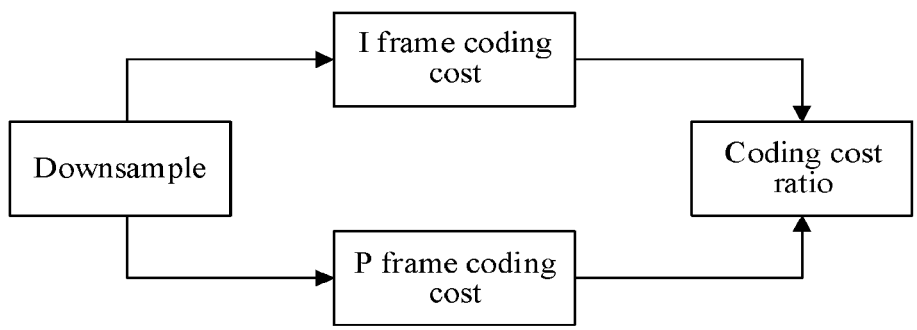
FIG. 5 is a flowchart of calculating a coding cost ratio according to another embodiment of this application.

FIG. 5 illustrates a process of calculating a coding cost ratio according to exemplary aspects of the present disclosure. In FIG. 5, the terminal first downsamples the $i^{th}$ video frame, then calculates an I frame coding cost (that is, the first coding cost calculated in a case that the $i^{th}$ video frame is assumed to be an I frame) and a P frame coding cost (that is, the second coding cost calculated in a case that the $i^{th}$ video frame is assumed to be a P frame), and divides the I frame coding cost by the P frame coding cost to obtain a coding cost ratio.

In step 407, a quantization parameter threshold is determined according to the coding cost ratio. In the exemplary embodiment, the terminal may input the coding cost ratio to a formula to calculate the quantization parameter threshold. A correspondence between coding cost ratios and quantization parameter thresholds may also be set, and the terminal searches for the quantization parameter threshold in the correspondence according to the coding cost ratio. However, other methods of determining the quantization parameter are also possible without departing from the scope of the present disclosure. The quantization parameter threshold herein is denoted by $QP_{TH}$.

The coding cost ratio is in a positive correlation with the quantization parameter threshold regardless of which mode is used to determine the quantization parameter threshold. Some video information is lost in downsampling, and human eyes are sensitive to an image quality loss in a static scenario and insensitive to an image quality loss in a movement scenario. Therefore, the terminal may set a larger quantization parameter threshold for video frames in the static scenario, so that encoding is performed by using the first coding resolution preferentially, thereby improving the image quality. The terminal sets a smaller quantization parameter threshold for video frames in the movement scenario, so that encoding is performed by using the second coding resolution preferentially, thereby improving the data compression ratio.

Generally, a smaller coding cost ratio indicates a more violent movement in a current scenario, and a smaller quantization parameter threshold needs to be set, so that encoding is performed by using the second coding resolution preferentially. A larger coding cost ratio indicates that the current scenario is more static, and a larger quantization parameter threshold needs to be set, so that encoding is performed by using the first coding resolution preferentially.

The quantization parameter threshold corresponds to the coding resolution. That is, different coding resolutions correspond to different quantization parameter thresholds. Generally, a difference obtained by subtracting the quantization parameter threshold corresponding to the second coding resolution from the quantization parameter threshold corresponding to the first coding resolution is equal to the first offset.

In step 408, a coding resolution of the $i^{th}$ video frame is determined as the first coding resolution in a case that the quantization parameter is less than or equal to the quantization parameter threshold, and a coding resolution of the $i^{th}$ video frame is determined as the second coding resolution in a case that the quantization parameter is greater than the quantization parameter threshold.

In the exemplary embodiment, the quantization parameter corresponds to the coding resolution, and the quantization parameter threshold also corresponds to the coding resolution. Therefore, it further needs to be ensured that the quantization parameter and the quantization parameter threshold correspond to the same coding resolution before the quantization parameter and the quantization parameter threshold are compared.

In a first exemplary embodiment, one threshold set is specified and the threshold set corresponds to a coding resolution. After the quantization parameter is obtained, the quantization parameter is converted according to the coding resolution corresponding to the threshold set, and the quantization parameter threshold is determined according to a final quantization parameter obtained after conversion and the threshold set. In a second exemplary embodiment, two threshold sets are specified and the two threshold sets correspond to different coding resolutions. After the quantization parameter is obtained, the coding resolution corresponding to the quantization parameter is first determined, a threshold set is then selected from the two threshold sets based on the coding resolution, and the quantization parameter threshold is determined according to the quantization parameter and the found threshold set. The threshold set is a set including at least two quantization parameter thresholds, and a first correspondence between quantization parameter thresholds and coding cost ratios is defined in the threshold set. For example, the threshold set represented by $$QP_{TH} = \begin{cases} 33 & IP\ cost < 3 \\ 36 & IP\ cost \geq 3 \end{cases}$$

includes two quantization parameter thresholds: 33 and 36 respectively. 33 corresponds to a coding cost ratio less than 3, and 36 corresponds to a coding cost ratio greater than or equal to 3.

The following provides further details of the two exemplary embodiments described above.

First Exemplary Embodiment

In a case that there is one threshold set and the threshold set corresponds to the first coding resolution, before the determining a coding resolution of the $i^{th}$ video frame according to the quantization parameter and the quantization parameter threshold, the quantization parameter is determined as the final quantization parameter in a case that the coding resolution of the $i^{th}$ video frame is assumed to be the first coding resolution during calculation of the quantization parameter. The first offset is added to the quantization parameter to obtain the final quantization parameter in a case that the coding resolution of the $i^{th}$ video frame is assumed to be the second coding resolution during calculation of the quantization parameter.

For example, there is one threshold set that corresponds to the first coding resolution. In a case that the coding resolution of the $i^{th}$ video frame is assumed to be the first coding resolution during calculation of the quantization parameter QP, QP is used as the final quantization parameter, and step 409 is performed. In a case that the coding resolution of the $i^{th}$ video frame is assumed to be the second coding resolution during calculation of the quantization parameter QP, QP+QP$_{delta}$ is used as the final quantization parameter, and step 409 is performed.

In a case that there is one threshold set and the threshold set corresponds to the second coding resolution, before the determining a coding resolution of the $i^{th}$ video frame according to the quantization parameter and the quantization parameter threshold, the first offset is subtracted from the quantization parameter to obtain the final quantization parameter in a case that the coding resolution of the $i^{th}$ video frame is assumed to be the first coding resolution during calculation of the quantization parameter. The quantization parameter is determined as the final quantization parameter in a case that the coding resolution of the $i^{th}$ video frame is assumed to be the second coding resolution during calculation of the quantization parameter.

For example, there is one threshold set that corresponds to the second coding resolution. In a case that the coding resolution of the $i^{th}$ video frame is assumed to be the first coding resolution during calculation of the quantization parameter QP, QP−QP$_{delta}$ is used as the final quantization parameter, and step 409 is performed. In a case that the coding resolution of the $i^{th}$ video frame is assumed to be the second coding resolution during calculation of the quantization parameter QP, QP is used as the final quantization parameter, and step 409 is performed.

Second Exemplary Embodiment

In a case that there are two threshold sets and the two threshold sets correspond to different coding resolutions, if the coding resolution of the $i^{th}$ video frame is assumed to be the first coding resolution during calculation of the quantization parameter, the quantization threshold parameter is determined according to the coding cost ratio, the two threshold sets and the first coding resolution. The determining the quantization parameter according to the coding cost ratio, the two threshold sets and the first coding resolution includes searching for a threshold set corresponding to the first coding resolution in the two threshold sets, and searching for the quantization threshold parameter in the found threshold set according to the coding cost ratio.

In the exemplary embodiment, a second correspondence between the two threshold sets and different coding resolutions is preset. In this case, when determining the quantization parameter according to the coding cost ratio, the two threshold sets and the first coding resolution, the terminal first searches for a threshold set corresponding to the first coding resolution in the two threshold sets based on the second correspondence, and then searches for a quantization parameter threshold corresponding to the coding cost ratio based on the first correspondence between quantization parameter thresholds and coding cost ratios defined in the threshold set.

For example, in the second correspondence, the threshold set corresponding to the first coding resolution is $$QP_{TH} = \begin{cases} 33 & IP\ cost < 3 \\ 36 & IP\ cost \geq 3 \end{cases},$$

and the threshold set corresponding to the second coding resolution is $$QP_{TH} = \begin{cases} 27 & IP\ cost < 3 \\ 30 & IP\ cost \geq 3 \end{cases}.$$

In a case that the coding resolution of the $i^{th}$ video frame is assumed to be the first coding resolution during calculation of the quantization parameter, the selected threshold set is $$QP_{TH} = \begin{cases} 33 & IP\ cost < 3 \\ 36 & IP\ cost \geq 3 \end{cases}.$$

In this case, if the coding cost ratio is less than 3, the obtained quantization parameter threshold is 33, and if the coding cost ratio is greater than or equal to 3, the obtained quantization parameter threshold is 36.

In a case that there are two threshold sets and the two threshold sets correspond to different coding resolutions, if the coding resolution of the $i^{th}$ video frame is assumed to be the second coding resolution during calculation of the quantization parameter, the quantization threshold parameter is determined according to the coding cost ratio, the two threshold sets and the second coding resolution. The determining the quantization parameter according to the coding cost ratio, the two threshold sets and the second coding resolution includes searching for a threshold set corresponding to the second coding resolution in the two threshold sets, and searching for the quantization threshold parameter in the found threshold set according to the coding cost ratio.

In the exemplary embodiment, a second correspondence between the two threshold sets and different coding resolutions is preset. In this case, when determining the quantization parameter according to the coding cost ratio, the two threshold sets and the second coding resolution, the terminal first searches for a threshold set corresponding to the second coding resolution in the two threshold sets based on the second correspondence, and then searches for a quantization parameter threshold corresponding to the coding cost ratio based on the first correspondence between quantization parameter thresholds and coding cost ratios defined in the threshold set.

For example, in the second correspondence, the threshold set corresponding to the first coding resolution is $$QP_{TH} = \begin{cases} 33 & IP \text{ cost} < 3 \\ 36 & IP \text{ cost} \geq 3 \end{cases},$$

and the threshold set corresponding to the second coding resolution is $$QP_{TH} = \begin{cases} 27 & IP \text{ cost} < 3 \\ 30 & IP \text{ cost} \geq 3 \end{cases}.$$

In a case that the coding resolution of the $i^{th}$ video frame is assumed to be the second coding resolution during calculation of the quantization parameter, the selected threshold set is $$QP_{TH} = \begin{cases} 27 & IP \text{ cost} < 3 \\ 30 & IP \text{ cost} \geq 3 \end{cases}.$$

In this case, if the coding cost ratio is less than 3, the obtained quantization parameter threshold is 27; if the coding cost ratio is greater than or equal to 3, the obtained quantization parameter threshold is 30.

In step 409, the $i^{th}$ video frame is encoded at the coding resolution. In a case that the $i^{th}$ video frame is encoded at the first coding resolution, the image quality is better, and the data compression ratio is relatively low. In a case that the $i^{th}$ video frame is encoded at the second coding resolution, the image quality is relatively poor, and the data compression ratio is relatively high.

In an exemplary embodiment, the video frame may be encoded based on the foregoing determined coding resolution by using video compression standards such as H.264, H.265, and an audio video coding standard (AVS).

Based on the foregoing, according to exemplary the video encoding method provided in this embodiment of this application, a quantization parameter and a quantization parameter threshold of a video frame are separately calculated, and a coding resolution of the video frame is determined according to the quantization parameter and the quantization parameter threshold. In this way, video frames of the same type may correspond to the same coding resolution, or may correspond to different coding resolutions, thereby resolving a problem that a coding mode is inflexible when video frames of the same type correspond to the same coding resolution, so that flexibility of the coding mode is improved.

Because the quantization parameter is correlated with the image quality, and the quantization parameter threshold is correlated with the desired image quality, the determining the coding resolution of the video frame according to the quantization parameter and the quantization parameter threshold is equivalent to selecting the coding resolution of the video frame according to the image quality and the desired image quality. When the desired image quantity is relatively high, the video frame is encoded at a higher first coding resolution, so as to improve the image quantity. When the desired image quality is relatively low, the video frame is encoded at a lower second coding resolution, so as to increase a data compression ratio.

By downsampling the video frame first and then calculating the coding cost ratio of the video frame, a data volume of the video frame may be reduced, a speed of subsequently calculating the first coding cost and the second coding cost is improved, and a speed of determining the coding resolution is finally improved.

Figure 6:
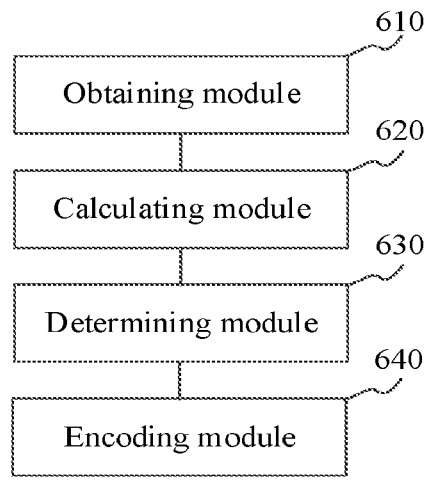
FIG. 6 is a structural block diagram of a video encoding apparatus according to an embodiment of this application.

FIG. 6 is a structural block diagram of a video encoding apparatus according to an exemplary embodiment of the present disclosure. The video encoding apparatus may be applied to the first terminal and the second terminal shown in FIG. 2. The video encoding apparatus includes an obtaining module 610 that obtains a to-be-encoded video, which includes at least two video frames arranged in sequence. A calculating module 620 calculates, for an $i^{th}$ video frame in the at least two video frames, a quantization parameter and a quantization parameter threshold of the $i^{th}$ video frame, where i is a positive integer greater than or equal to 2. A determining module 630 determines a coding resolution of the $i^{th}$ video frame according to the quantization parameter and the quantization parameter threshold obtained by the calculating module 620. The coding resolution is a first coding resolution or a second coding resolution. The first coding resolution is a resolution in a case that the $i^{th}$ video frame is sampled, and the second coding resolution is a resolution in a case that the $i^{th}$ video frame is downsampled. An encoding module 640 encodes the $i^{th}$ video frame at the coding resolution determined by the determining module 630.

The calculating module 620 may also read a specified quantization parameter, and determine the quantization parameter as the quantization parameter of the $i^{th}$ video frame in a case that a coding mode of the $i^{th}$ video frame is a fixed-quality coding mode. The calculating module 620 also calculates a quantization parameter of a first coding block in the $i^{th}$ video frame, and determines the quantization parameter of the first coding block as the quantization parameter of the $i^{th}$ video frame in a case that the coding mode of the $i^{th}$ video frame is a fixed-bit-rate coding mode.

Optionally, the calculating module 620 is further configured to calculate, in a case that an $(i-1)^{th}$ video frame is an I frame and the $(i-1)^{th}$ video frame is encoded at the second coding resolution, an average value of actual quantization parameters of all coding blocks in the $(i-1)^{th}$ video frame, obtain a first offset and a second offset, and determine a sum of the average value, the first offset and the second offset as the quantization parameter of the first coding block. The calculating module 620 may also calculate, in a case that an $(i-1)^{th}$ video frame is an I frame and the $(i-1)^{th}$ video frame is encoded at the first coding resolution, an average value of actual quantization parameters of all coding blocks in the $(i-1)^{th}$ video frame, obtain a second offset, and determine a sum of the average value and the second offset as the quantization parameter of the first coding block. The calculating module 620 may further calculate, in a case that an $(i-1)^{th}$ video frame is a P frame and the $(i-1)^{th}$ video frame is encoded at the first coding resolution, an average value of actual quantization parameters of all coding blocks in the $(i-1)^{th}$ video frame, and determine the average value as the quantization parameter of the first coding block; and may calculate, in a case that an $(i-1)^{th}$ video frame is a P frame and the $(i-1)^{th}$ video frame is encoded at the second coding resolution, an average value of actual quantization parameters of all coding blocks in the $(i-1)^{th}$ video frame, obtain a first offset, and determine a sum of the average value and the first offset as the quantization parameter of the first coding block. The first offset being an offset between a quantization parameter corresponding to the first coding resolution and a quantization parameter corresponding to the second coding resolution, and the second offset being an offset between quantization parameters of the I frame and the P frame. For further exemplary descriptions of the functions of the calculating module 620, reference can be made to the description in step 403.

The calculating module 620 may calculate a first coding cost in a case that the $i^{th}$ video frame is assumed to be an I frame, calculate a second coding cost in a case that the $i^{th}$ video frame is assumed to be a P frame, divide the first coding cost by the second coding cost to obtain a coding cost ratio, and determine the quantization parameter threshold according to the coding cost ratio, the coding cost ratio being in a positive correlation with the quantization parameter threshold. Reference may be made to steps 404 to 407, described above, for additional details regarding the calculation of the quantization parameter threshold of the $i^{th}$ video frame described above, refer to the description in step 404 to step 407.

The calculating module 620 may also divide the $i^{th}$ video frame into at least two coding blocks, perform intra-frame prediction coding on the coding blocks to obtain intra-frame coding costs, and determine a sum of the intra-frame coding costs as the first coding cost. Reference may be made to step 404, described above, for further details regarding the calculation of the first coding cost.

The calculating module 620 may further divide the $i^{th}$ video frame into at least two coding blocks, perform inter-frame prediction coding on the coding blocks to obtain inter-frame coding costs; and determine a sum of the inter-frame coding costs as the second coding cost. Reference may be made to the descriptions of step 405 above for additional details regarding the calculation of the second coding cost. The calculation module may downsample the $i^{th}$ video frame before dividing the $i^{th}$ video frame into the at least two coding blocks, as described above.

In a case that there are two threshold sets and the two threshold sets correspond to different coding resolutions, the calculating module 620 may determine the quantization threshold parameter according to the coding cost ratio, the two threshold sets and the first coding resolution in a case that the coding resolution of the $i^{th}$ video frame is assumed to be the first coding resolution during calculation of the quantization parameter. The calculating module 620 may also determine the quantization threshold parameter according to the coding cost ratio, the two threshold sets and the second coding resolution in a case that the coding resolution of the $i^{th}$ video frame is assumed to be the second coding resolution during calculation of the quantization parameter. Further details regarding the calculation of the quantization parameter threshold may be found in the descriptions of step 408 above.

The calculating module 620 may also search for a threshold set corresponding to the first coding resolution in the two threshold sets, and search for the quantization threshold parameter in the found threshold set according to the coding cost ratio. For additional details regarding calculating the quantization parameter threshold, reference may be made to step 408 above.

The calculating module 620 may further search for a threshold set corresponding to the second coding resolution in the two threshold sets, and search for the quantization threshold parameter in the found threshold set according to the coding cost ratio, as described above with reference to step 408.

The determining module 630 may determine that the coding resolution of the $i^{th}$ video frame is the first coding resolution in a case that the quantization parameter is less than or equal to the quantization parameter threshold, and determine that the coding resolution of the $i^{th}$ video frame is the second coding resolution in a case that the quantization parameter is greater than the quantization parameter threshold, as described above with reference to step 409.

In a case that there is one threshold set and the threshold set corresponds to the first coding resolution, the determining module 630 may determine the quantization parameter as a final quantization parameter in a case that the coding resolution of the $i^{th}$ video frame is assumed to be the first coding resolution during calculation of the quantization parameter, and add the first offset to the quantization parameter to obtain the final quantization parameter in a case that the coding resolution of the $i^{th}$ video frame is assumed to be the second coding resolution during calculation of the quantization parameter. Further details of calculating the quantization parameter threshold may be found in step 408 described above.

In a case that there is one threshold set and the threshold set corresponds to the first coding resolution, the determining module 630 may subtract the first offset from the quantization parameter to obtain a final quantization parameter in a case that the coding resolution of the $i^{th}$ video frame is assumed to be the first coding resolution during calculation of the quantization parameter, and determine the quantization parameter as the final quantization parameter in a case that the coding resolution of the $i^{th}$ video frame is assumed to be the second coding resolution during calculation of the quantization parameter Further details regarding the calculation of the quantization parameter are described with reference to step 408 above.

Based on the foregoing, according to the video encoding apparatus provided in the exemplary embodiment of the present disclosure, a quantization parameter and a quantization parameter threshold of a video frame are separately calculated, and a coding resolution of the video frame is determined according to the quantization parameter and the quantization parameter threshold. In this way, video frames of the same type may correspond to the same coding resolution, or may correspond to different coding resolutions, thereby resolving a problem that a coding mode is inflexible when video frames of the same type correspond to the same coding resolution, so that flexibility of the coding mode is improved.

Because the quantization parameter is correlated with the image quality, and the quantization parameter threshold is correlated with the desired image quality, the determining the coding resolution of the video frame according to the quantization parameter and the quantization parameter threshold is equivalent to selecting the coding resolution of the video frame according to the image quality and the desired image quality. When the desired image quality is relatively high, the video frame is encoded at a higher first coding resolution, so as to improve the image quantity. When the desired image quality is relatively low, the video frame is encoded at a lower second coding resolution, to increase a data compression ratio.

By downsampling the video frame first and then calculating the coding cost ratio of the video frame, a data volume of the video frame may be reduced, so that a speed of subsequently calculating the first coding cost and the second coding cost is improved, and a speed of determining the coding resolution is finally improved.

Figure 7:
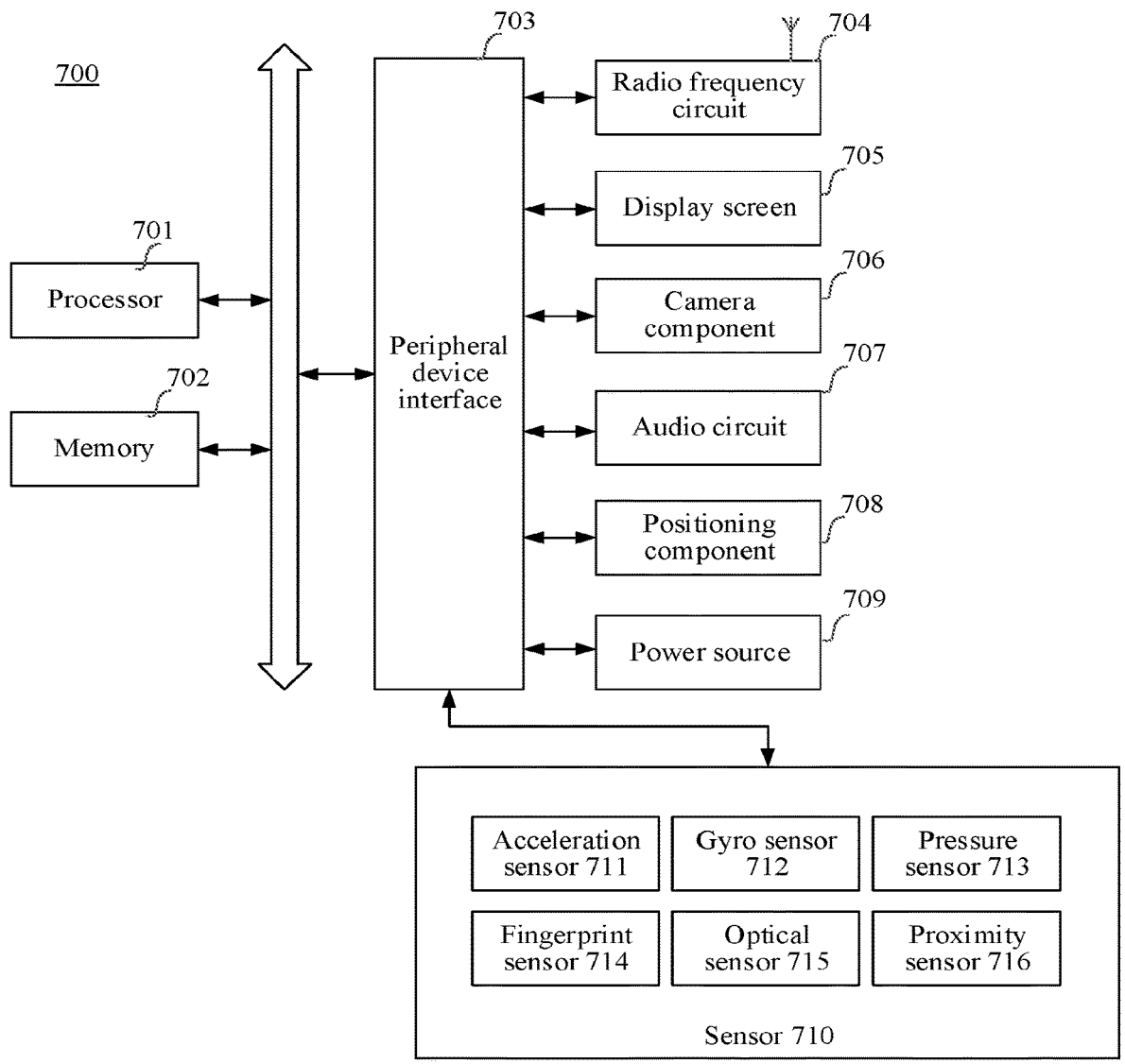
FIG. 7 is a structural block diagram of a video encoding apparatus according to another embodiment of this application.

FIG. 7 is a structural block diagram of a terminal 700 according to an exemplary embodiment of the present disclosure. The terminal 700 may be a portable mobile terminal, for example, a smartphone, a tablet computer, a moving picture experts group audio layer III (MP3) player, a moving picture experts group audio layer IV (MP4) player, a notebook computer, or a desktop computer. The terminal 700 may also be referred to as a user device, a portable terminal, a laptop terminal, or a desktop terminal. Generally, the terminal 700 includes circuitry such as a processor 701 and a memory 702.

The processor 701 may include one or more processing cores, for example, a 4-core processor or an 8-core processor. The processor 701 may be implemented in at least one hardware form of digital signal processing (DSP), a field programmable gate array (FPGA), and a programmable logic array (PLA). The processor 701 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 701 may be integrated with a graphics processing unit (GPU). The GPU is configured to be responsible for rendering and drawing content that a display screen needs to display. In some embodiments, the processor 701 may further include an artificial intelligence (AI) processor. The AI processor is configured to process a computing operation related to machine learning.

The memory 702 may include one or more non-transitory computer-readable storage media. The memory 702 may further include a high-speed random access memory and a nonvolatile memory, for example, one or more disk storage devices or flash storage devices. In some embodiments, the non-transitory computer-readable storage medium in the memory 702 is configured to store at least one instruction, the at least one instruction being configured to be executed by the processor 701 to implement the video encoding method provided in the method embodiments of this application.

In some embodiments, the terminal 700 may further include circuitry such as a peripheral device interface 703 and at least one peripheral device. The processor 701, the memory 702 and the peripheral device interface 703 may be connected through a bus or a signal line. Each peripheral device may be connected to the peripheral device interface 703 through the bus, the signal line, or a circuit board. Specifically, the peripheral device includes: at least one of a radio frequency circuit 704, a touch display screen 705, a camera component 706, a frequency circuit 707, a positioning component 708, and a power source 709.

The peripheral device interface 703 may be configured to connect at least one input/output (I/O)-related peripheral device to the processor 701 and the memory 702. In some embodiments, the processor 701, the memory 702 and the peripheral device interface 703 are integrated on a same chip or circuit board. In other some embodiments, any one or two of the processor 701, the memory 702, and the peripheral device interface 703 may be implemented on a single chip or the circuit board. This is not limited in this embodiment.

The radio frequency circuit 704 is configured to receive and transmit a radio frequency (RF) signal, which is also referred to as an electromagnetic signal. The RF circuit 704 communicates with a communications network and other communications devices by using the electromagnetic signal. The RF circuit 704 converts an electrical signal into an electromagnetic signal for transmission, or converts a received electromagnetic signal into an electrical signal. Optionally, the RF circuit 704 includes: an antenna system, an RF transceiver, one or more amplifiers, a tuner, an oscillator, a digital signal processor, a codec chip set, a subscriber identity module card, and the like. The RF circuit 704 may communicate with other terminals through at least one wireless communication protocol. The wireless communication protocol includes, but is not limited to a metropolitan area network, mobile communication networks (2G, 3G, 4G, and 5G) of various generations, a wireless local area network and/or a WiFi network. In some embodiments, the RF circuit 704 may also include a circuit related to near field communication (NFC). This is not limited in this application.

The display screen 705 is configured to display a user interface (UI). The UI may include a graphic, a text, an icon, a video, and any combination thereof. When the display screen 705 is a touch display screen, the display screen 705 is further capable of collecting touch signals on or above a surface of the display screen 705. The touch signal may be inputted as a control signal to the processor 701 for processing. In this case, the display screen 705 may be further configured to provide a virtual button and/or a virtual keyboard, which is also referred to as a soft button and/or a soft keyboard. In some embodiments, there may be one display screen 705, disposed on a front panel of the terminal 700. In other exemplary embodiments, there may be at least two display screens 705, disposed on different surfaces of the terminal 700 respectively or adopting a folded design. In still other exemplary embodiments, the display screen 705 may be a flexible display screen, disposed on a curved surface or a folded surface of the terminal 700. Even, the display screen 705 may be further set in a non-rectangular irregular pattern, namely, a special-shaped screen. The display screen 705 may be made of materials such as a liquid crystal display (LCD), an organic light-emitting diode (OLED), or the like.

The camera component 706 is configured to collect an image or a video. The camera component 706 may include a front-facing camera and a rear-facing camera. Generally, the front-facing camera is disposed on the front panel of the terminal, and the rear-facing camera is disposed on a rear surface of the terminal. In exemplary embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera component 706 may further include a flash. The flash may be a monochrome temperature flash, or may be a double color temperature flash. The double color temperature flash refers to a combination of a warm light flash and a cold light flash, and may be used for light compensation under different color temperatures.

The frequency circuit 707 may include a microphone and a speaker. The microphone is configured to collect sound waves of a user and an environment, and convert the sound waves into an electrical signal to input to the processor 701 for processing, or input to the radio frequency circuit 704 for implementing voice communication. For stereo collection or noise reduction, there may be a plurality of microphones, disposed at different portions of the terminal 700 respectively. The microphone may alternatively be an array microphone or an omni-directional collection microphone. The speaker is configured to convert an electrical signal from the processor 701 or the radio frequency circuit 704 into sound waves. The speaker may be a conventional film speaker, or may be a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the frequency circuit 707 may also include an earphone jack.

The positioning component 708 is a circuit configured to position a current geographic location of the terminal 700 for implementing navigation or a location based service (LBS). The positioning component 708 may be a positioning component based on the Global Positioning System (GPS) of the United States, the BeiDou System of China, the GLONASS System of Russia, or the GALILEO System of the European Union.

The power source 709 is configured to supply power for various components in the terminal 700. The power source 709 may be an alternating current, a direct current, a disposable battery, or a rechargeable battery. When the power source 709 includes a rechargeable battery, the rechargeable battery may be a wired rechargeable battery or a wireless rechargeable battery. The rechargeable battery may be further configured to support a fast charge technology.

In exemplary embodiments, the terminal 700 may also include one or more sensors 710. The one or more sensors 710 include, but are not limited to, an acceleration sensor 711, a gyro sensor 712, a pressure sensor 713, a fingerprint sensor 714, an optical sensor 715, and a proximity sensor 716.

The acceleration sensor 711 may detect the magnitude of acceleration on three coordinate axes of a coordinate system established by the terminal 700. For example, the acceleration sensor 711 may be configured to detect components of gravity acceleration on the three coordinate axes. The processor 701 may control, according to a gravity acceleration signal collected by the acceleration sensor 711, the touch display screen 705 to display the user interface in a transverse view or a longitudinal view. The acceleration sensor 711 may be further configured to collect game or user motion data.

The gyro sensor 712 may detect a body direction and a rotation angle of the terminal 700. The gyro sensor 712 may cooperate with the acceleration sensor 711 to collect a 3D action performed by the user on the terminal 700. The processor 701 may, based on the data collected by the gyro sensor 712, perform motion sensing (for example, changing the UI according to a tilt operation of the user), image stabilization during shooting, game control, and inertial navigation.

The pressure sensor 713 may be disposed at a side frame of the terminal 700 and/or a lower layer of the touch display screen 705. When disposed on the side frame of the terminal 700, the pressure sensor 713 may detect a holding signal of the user to the terminal 700, and left/right hand recognition and a quick action may be performed by the processor 701 according to the holding signal collected by the pressure sensor 713. When the pressure sensor 713 is disposed at the lower layer of the touch display screen 705, the processor 701 controls an operable control on the UI interface according to a pressure operation performed by the user on the touch display screen 705. The operable control includes at least one of a button control, a scroll-bar control, an icon control and a menu control.

The fingerprint sensor 714 is configured to collect a user's fingerprint, and the processor 701 identifies a user's identity according to the fingerprint collected by the fingerprint sensor 714, or the fingerprint sensor 714 identifies a user's identity according to the collected fingerprint. When identifying that the user's identity is a trusted identity, the processor 701 authorizes the user to perform related sensitive operations. The sensitive operations include unlocking a screen, viewing encryption information, downloading software, paying, changing a setting, and the like. The fingerprint sensor 714 may be disposed on a front surface, a rear surface, or a side surface of the terminal 700. When a physical button or a vendor logo is disposed on the terminal 700, the fingerprint sensor 714 may be integrated with the physical button or the vendor logo.

The optical sensor 715 is configured to collect ambient light intensity. In an embodiment, the processor 701 may control the display brightness of the touch display screen 705 according to the ambient light intensity collected by the optical sensor 715. Specifically, when the ambient light intensity is relatively high, the display brightness of the touch display screen 705 is increased. When the ambient light intensity is relatively low, the display brightness of the touch display screen 705 is decreased. In another embodiment, the processor 701 may further dynamically adjust a camera parameter of the camera component 706 according to the ambient light intensity collected by the optical sensor 715.

The proximity sensor 716, also referred to as a distance sensor, is generally disposed on the front panel of the terminal 700. The proximity sensor 716 is configured to collect a distance between the user and the front surface of the terminal 700. In an embodiment, when the proximity sensor 716 detects that the distance between the user and the front surface of the terminal 700 becomes smaller, the touch display screen 705 is controlled by the processor 701 to switch from a screen-on state to a screen-off state. When the proximity sensor 716 detects that the distance between the user and the front surface of the terminal 700 becomes larger, the touch display screen 705 is controlled by the processor 701 to switch from the screen-off state to the screen-on state.

A person skilled in the art will recognize that the structure illustrated in FIG. 7 is merely an exemplary terminal 700, and that the terminal may include more or fewer components than those shown in the figure, or some components may be combined, or a different component deployment may be used. Thus, the hardware structure of the terminal 700 is not limiting upon the present disclosure.

An exemplary embodiment of the present disclosure includes a non-transitory computer-readable storage medium that stores at least one instruction, at least one program, a code set, or an instruction set. The at least one instruction, the at least one program, the code set, or the instruction set are loaded and executed by a processor to implement the video encoding method described above.

An exemplary embodiment of the present disclosure includes a video encoding device, including a processor and a memory. The memory stores at least one instruction that is loaded and executed by the processor to implement the video encoding method described above.

When the video encoding apparatus provided in the foregoing exemplary embodiment encodes a video, division of the foregoing functional modules is only described as an example. As can be appreciated, the foregoing functions may be allocated to and accomplished by different functional modules according to requirements, that is, the internal structure of the video encoding apparatus is divided into different functional modules, to accomplish all or some of the above described functions. Moreover, the video encoding apparatus provided in the foregoing embodiment belongs to the same concept as the embodiment of the video encoding method. For details of a specific implementation process thereof, refer to the method embodiment as further descriptions are omitted here for the sake of brevity.

A person of ordinary skill will recognize that all or some of the steps of the exemplary embodiments may be implemented by hardware, or may be implemented by a program instructing related hardware. The program may be stored in a non-transitory computer-readable storage medium, which may include any of a read-only memory, a magnetic disk, or an optical disc.

The foregoing descriptions of exemplary embodiments are not limiting upon the present disclosure. Any modification, equivalent replacement, or improvement made within the spirit and principle of the embodiments of this application shall fall within the protection scope of the present disclosure.

What is claimed is:

1. A video encoding method, comprising:
    obtaining, by circuitry of a terminal, a to-be-encoded video, the video including at least two video frames arranged in sequence;
    calculating, by the circuitry of the terminal and for an $i^{th}$ video frame in the at least two video frames, a quantization parameter and a quantization parameter threshold of the $i^{th}$ video frame, i being a positive integer greater than or equal to 2;
    determining, by the circuitry of the terminal, a coding resolution of the $i^{th}$ video frame according to the quantization parameter and the quantization parameter threshold, the coding resolution being a first coding resolution or a second coding resolution, the first coding resolution being a resolution in a case that the $i^{th}$ video frame is sampled, and the second coding resolution being a resolution in a case that the $i^{th}$ video frame is downsampled; and
    encoding, by the circuitry of the terminal, the $i^{th}$ video frame at the coding resolution,
    wherein, in a case that there are two threshold sets and the two threshold sets correspond to different coding resolutions, the determining, comprises:
    determining a quantization parameter according to a coding cost ratio between a first coding cost based on the $i^{th}$ video frame being an I frame and a second coding cost based on the $i^{th}$ frame being a P frame, the two threshold sets, and the first coding resolution in a case that the coding resolution of the $i^{th}$ video frame is assumed to be the first coding resolution during calculation of the quantization parameter; and
    determining the quantization threshold parameter according to the coding cost ratio, the two threshold sets, and the second coding resolution in a case that the coding resolution of the $i^{th}$ video frame is assumed to be the second coding resolution during calculation of the quantization parameter.

2. The method according to claim 1, wherein the calculating a quantization parameter of the $i^{th}$ video frame comprises:
    reading a specified quantization parameter;
    determining the quantization parameter as the quantization parameter of the $i^{th}$ video frame in a case that a coding mode of the $i^{th}$ video frame is a fixed-quality coding mode;
    calculating a quantization parameter of a first coding block in the $i^{th}$ video frame; and
    determining the quantization parameter of the first coding block as the quantization parameter of the $i^{th}$ video frame in a case that the coding mode of the $i^{th}$ video frame is a fixed-bit-rate coding mode.

3. The method according to claim 2, wherein the calculating comprises:
    calculating, in a case that an $(i-1)^{th}$ video frame is an I frame and the $(i-1)^{th}$ video frame is encoded at the second coding resolution, an average value of actual quantization parameters of all coding blocks in the $(i-1)^{th}$ video frame, obtaining a first offset and a second offset, determining a sum of the average value, the first offset and the second offset as the quantization parameter of the first coding block;
    calculating, in a case that an $(i-1)^{th}$ video frame is an I frame and the $(i-1)^{th}$ video frame is encoded at the first coding resolution, the average value of actual quantization parameters of all coding blocks in the $(i-1)^{th}$ video frame, obtaining the second offset, and determining a sum of the average value and the second offset as the quantization parameter of the first coding block;
    calculating, in a case that an $(i-1)^{th}$ video frame is a P frame and the $(i-1)^{th}$ video frame is encoded at the first coding resolution, the average value of actual quantization parameters of all coding blocks in the $(i-1)^{th}$ video frame, and determining the average value as the quantization parameter of the first coding block; and
    calculating, in a case that an $(i-1)^{th}$ video frame is a P frame and the $(i-1)^{th}$ video frame is encoded at the second coding resolution, the average value of actual quantization parameters of all coding blocks in the $(i-1)^{th}$ video frame, obtaining the first offset, and determining a sum of the average value and the first offset as the quantization parameter of the first coding block,
    wherein the first offset is an offset between a quantization parameter corresponding to the first coding resolution and a quantization parameter corresponding to the second coding resolution, and the second offset is an offset between quantization parameters of the I frame and the P frame.

4. The method according to claim 1, wherein the calculating comprises:
    dividing the first coding cost by the second coding cost to obtain a coding cost ratio; and determining the quantization parameter threshold according to the coding cost ratio, the coding cost ratio being in a positive correlation with the quantization parameter threshold.

5. The method according to claim 4, wherein the calculating the first coding cost comprises:
dividing the $i^{th}$ video frame into at least two coding blocks;
performing intra-frame prediction coding on the coding blocks to obtain intra-frame coding costs; and
determining a sum of the intra-frame coding costs as the first coding cost.

6. The method according to claim 4, wherein the calculating the second coding cost comprises:
dividing the $i^{th}$ video frame into at least two coding blocks;
performing inter-frame prediction coding on the coding blocks to obtain inter-frame coding costs; and
determining a sum of the inter-frame coding costs as the second coding cost.

7. The method according to claim 1, wherein the determining the quantization threshold parameter according to the coding cost ratio, the two threshold sets and the first coding resolution comprises:
searching for a threshold set corresponding to the first coding resolution in the two threshold sets; and
searching for the quantization threshold parameter in the threshold set according to the coding cost ratio.

8. The method according to claim 1, wherein the determining the quantization threshold parameter according to the coding cost ratio, the two threshold sets and the second coding resolution comprises:
searching for a threshold set corresponding to the second coding resolution in the two threshold sets; and
searching for the quantization threshold parameter in the threshold set according to the coding cost ratio.

9. The method according to claim 1, wherein the determining comprises:
determining that the coding resolution of the $i^{th}$ video frame is the first coding resolution in a case that the quantization parameter is less than or equal to the quantization parameter threshold; and
determining that the coding resolution of the video frame is the second coding resolution in a case that the quantization parameter is greater than the quantization parameter threshold.

10. The method according to claim 9, wherein, in a case that there is one threshold set and the threshold set corresponds to the first coding resolution, before the determining a coding resolution of the video frame according to the quantization parameter and the quantization parameter threshold, the method further comprises:
determining the quantization parameter as a final quantization parameter in a case that the coding resolution of the $i^{th}$ video frame is assumed to be the first coding resolution during calculation of the quantization parameter; and
adding a first offset to the quantization parameter to obtain the final quantization parameter in a case that the coding resolution of the $i^{th}$ video frame is assumed to be the second coding resolution during calculation of the quantization parameter.

11. The method according to claim 9, wherein, in a case that there is one threshold set and the threshold set corresponds to the second coding resolution, before the determining a coding resolution of the $i^{th}$ video frame according to the quantization parameter and the quantization parameter threshold, the method further comprises:
subtracting the first offset from the quantization parameter to obtain a final quantization parameter in a case that the coding resolution of the $i^{th}$ video frame is assumed to be the first coding resolution during calculation of the quantization parameter; and
determining the quantization parameter as the final quantization parameter in a case that the coding resolution of the $i^{th}$ video frame is assumed to be the second coding resolution during calculation of the quantization parameter.

12. A video encoding apparatus, comprising:
circuitry configured to:
obtain a to-be-encoded video, the video including at least two video frames arranged in sequence;
calculate, for an $i^{th}$ video frame in the at least two video frames, a quantization parameter, and a quantization parameter threshold of the $i^{th}$ video frame, i being a positive integer greater than or equal to 2;
determine a coding resolution of the $i^{th}$ video frame according to the quantization parameter and the quantization parameter threshold, the coding resolution being a first coding resolution or a second coding resolution, the first coding resolution being a resolution in a case that the $i^{th}$ video frame is sampled, and the second coding resolution being a resolution in a case that the $i^{th}$ video frame is downsampled; and
encode the $i^{th}$ video frame at the coding resolution determined by the determining module,
wherein, in a case that there are two threshold sets and the two threshold sets correspond to different coding resolutions, the determining comprises:
determining a quantization parameter according to a coding cost ratio between a first coding cost based on the $i^{th}$ video frame being an I frame and a second coding cost based on the $i^{th}$ frame being a P frame, the two threshold sets, and the first coding resolution in a case that the coding resolution of the $i^{th}$ video frame is assumed to be the first coding resolution during calculation of the quantization parameter; and
determining the quantization threshold parameter according to the coding cost ratio, the two threshold sets, and the second coding resolution in a case that the coding resolution of the $i^{th}$ video frame is assumed to be the second coding resolution during calculation of the quantization parameter.

13. The apparatus according to claim 12, wherein the circuitry is further configured to:
read a specified quantization parameter, and determine the quantization parameter as the quantization parameter of the $i^{th}$ video frame, in a case that a coding mode of the $i^{th}$ video frame is a fixed-quality coding mode; and
calculate a quantization parameter of a first coding block in the $i^{th}$ video frame, and determine the quantization parameter of the first coding block as the quantization parameter of the $i^{th}$ video frame in a case that the coding mode of the $i^{th}$ video frame is a fixed-bit-rate coding mode.

14. The apparatus according to claim 13, wherein the circuitry is further configured to:
calculate, in a case that an $(i-1)^{th}$ video frame is an I frame and the $(i-1)^{th}$ video frame is encoded at the second coding resolution, an average value of actual quantization parameters of all coding blocks in the $(i-1)^{th}$ video frame, obtain a first offset and a second offset, and determine a sum of the average value, the first offset and the second offset as the quantization parameter of the first coding block;
calculate, in a case that an $(i-1)^{th}$ video frame is an I frame and the $(i-1)^{th}$ video frame is encoded at the first coding resolution, the average value of actual quantization parameters of all coding blocks in the $(i-1)^{th}$ video frame, obtain the second offset, and determine a sum of the average value and the second offset as the quantization parameter of the first coding block;
calculate, in a case that an $(i-1)^{th}$ video frame is a P frame and the $(i-1)^{th}$ video frame is encoded at the first coding resolution, the average value of actual quantization parameters of all coding blocks in the $(i-1)^{th}$ video frame, and determine the average value as the quantization parameter of the first coding block; and
calculate, in a case that an $(i-1)^{th}$ video frame is a P frame and the $(i-1)^{th}$ video frame is encoded at the second coding resolution, the average value of actual quantization parameters of all coding blocks in the $(i-1)^{th}$ video frame, obtain the first offset, and determine a sum of the average value and the first offset as the quantization parameter of the first coding block, wherein the first offset is an offset between a quantization parameter corresponding to the first coding resolution and a quantization parameter corresponding to the second coding resolution, and the second offset is an offset between quantization parameters of the I frame and the P frame.

15. The apparatus according to claim 12, wherein the circuitry is further configured to:
divide the first coding cost by the second coding cost to obtain a coding cost ratio; and
determine the quantization parameter threshold according to the coding cost ratio, the coding cost ratio being in a positive correlation with the quantization parameter threshold.

16. The apparatus according to claim 15, wherein the circuitry is further configured to:
divide the $i^{th}$ video frame into at least two coding blocks;
perform intra-frame prediction coding on the coding blocks to obtain intra-frame coding costs; and
determine a sum of the intra-frame coding costs as the first coding cost.

17. The apparatus according to claim 15, wherein the circuitry is further configured to:
divide the $i^{th}$ video frame into at least two coding blocks;
perform inter-frame prediction coding on the coding blocks to obtain inter-frame coding costs; and
determine a sum of the inter-frame coding costs as the second coding cost.

18. A non-transitory computer-readable medium encoded with computer-readable instructions that, when executed by a processor, cause the processor to perform a method comprising:
obtaining a to-be-encoded video, the video including at least two video frames arranged in sequence;
calculating, for an $i^{th}$ video frame in the at least two video frames, a quantization parameter and a quantization parameter threshold of the $i^{th}$ video frame, i being a positive integer greater than or equal to 2;
determining a coding resolution of the $i^{th}$ video frame according to the quantization parameter and the quantization parameter threshold, the coding resolution being a first coding resolution or a second coding resolution, the first coding resolution being a resolution in a case that the $i^{th}$ video frame is sampled, and the second coding resolution being a resolution in a case that the $i^{th}$ video frame is downsampled; and
encoding the $i^{th}$ video frame at the coding resolution,
wherein, in a case that there are two threshold sets and the two threshold sets correspond to different coding resolutions, the determining comprises:
determining a quantization parameter according to a coding cost ratio between a first coding cost based on the $i^{th}$ video frame being an I frame and a second coding cost based on the $i^{th}$ frame being a P frame, the two threshold sets, and the first coding resolution in a case that the coding resolution of the $i^{th}$ video frame is assumed to be the first coding resolution during calculation of the quantization parameter; and
determining the quantization threshold parameter according to the coding cost ratio, the two threshold sets, and the second coding resolution in a case that the coding resolution of the $i^{th}$ video frame is assumed to be the second coding resolution during calculation of the quantization parameter.

19. The method according to claim 1, wherein the quantization parameter threshold being larger for video frames corresponding to a static scenario than for video frames corresponding to a movement scenario.

20. The apparatus according to claim 12, wherein the quantization parameter threshold being larger for video frames corresponding to a static scenario than for video frames corresponding to a movement scenario.

* * * * *